United States Patent [19]

Boo et al.

[11] Patent Number: 5,183,212
[45] Date of Patent: Feb. 2, 1993

[54] METHOD FOR SEPARATING MULTILAYER PLASTICS INTO ITS COMPONENTS

[75] Inventors: H. Khim Boo, Strongsville; Donald H. Mittendorf, Lorain; Walter A. Sell, Wakeman, all of Ohio

[73] Assignee: The B. F. Goodrich Company, Akron, Ohio

[21] Appl. No.: 871,781

[22] Filed: Apr. 21, 1992

[51] Int. Cl.$^5$ ............................ B02C 1/00; C08J 11/00
[52] U.S. Cl. ........................................ 241/17; 241/20; 241/24; 241/DIG. 38; 521/46.5
[58] Field of Search .................... 521/46.5; 209/3, 4, 209/172, 172.5; 241/17, 20, 23, 24, DIG. 38

[56] References Cited

U.S. PATENT DOCUMENTS

| | | | |
|---|---|---|---|
| 3,268,071 | 8/1966 | Puddington et al. | 209/5 |
| 3,516,841 | 6/1970 | Haveman | 106/193 |
| 3,670,969 | 6/1972 | Terada | 241/27 |
| 3,814,240 | 6/1974 | Laundrie | 209/11 |
| 3,836,486 | 9/1974 | Hafner | 260/2.3 |
| 3,925,200 | 12/1975 | Izumi et al. | 209/9 |
| 3,926,790 | 12/1975 | Izumi | 209/9 |
| 3,926,791 | 12/1975 | Izumi et al. | 109/9 |
| 3,976,563 | 8/1976 | Scalco | 209/3 |
| 4,000,031 | 12/1976 | Acobas | 262/4 |
| 4,020,992 | 3/1977 | Bineger et al. | 241/DIG. 38 |
| 4,067,826 | 1/1978 | Emery | 260/2.3 |
| 4,105,593 | 8/1978 | Stavrinou | 260/2.3 |
| 4,119,533 | 10/1978 | Saitoh et al. | 209/155 |
| 4,132,633 | 1/1979 | Saitoh et al. | 209/9.3 |
| 4,199,109 | 4/1980 | Watanabe | 241/14 |
| 4,352,732 | 10/1981 | Massicotte | 209/17 |
| 4,379,525 | 4/1983 | Nowicki et al. | 241/205 |
| 4,578,184 | 3/1986 | Rasmussen | 209/3 |
| 4,610,396 | 9/1986 | Serra et al. | 241/DIG. 38 |
| 4,617,111 | 10/1986 | Grimm et al. | 209/4 |
| 4,728,045 | 3/1988 | Tomaszek | 241/19 |
| 4,746,422 | 5/1988 | Grimma | 209/172 |
| 4,775,464 | 4/1988 | Ferrara et al. | 209/172 |
| 4,826,897 | 5/1989 | Mehra et al. | 523/455 |
| 5,022,985 | 6/1991 | Nugent | 209/172.5 |
| 5,061,735 | 10/1991 | Zielinski | 521/465 |

FOREIGN PATENT DOCUMENTS

83/02281 7/1983 PCT Int'l Appl. ............... 521/46.5

Primary Examiner—Douglas D. Watts
Attorney, Agent, or Firm—Helen A. Odar

[57] ABSTRACT

A novel process has been found wherein multilayer plastic materials are efficiently and effectively separated. The multilayer plastic materials are divided into smaller particles, the particles are agglomerated and then like particles are separated from the other particles. This novel method is useful for recycling multilayer extruded plastic materials.

12 Claims, No Drawings

METHOD FOR SEPARATING MULTILAYER PLASTICS INTO ITS COMPONENTS

BACKGROUND OF THE INVENTION

1. Field of Invention

This invention relates to a method for separating and recovering the components from materials or articles formed from multilayer plastics. More particularly, this invention relates to a process of separating and recovering at least two desired components of articles formed of co-extruded multilayer plastics.

2. Description of the Art

Due to the large number of articles manufactured from various plastics, discarded plastics have become a large source of waste materials which need to be placed in landfills. Some of the waste plastics are difficult to degrade and possibly hazardous to the environment. Thus, recycling and reclaiming discarded waste plastics has become important in controlling pollution and preserving the environment.

Numerous methods have been developed for separating waste plastic materials. Generally, plastic waste materials can be separated into the desired components which make up the material by various flotation processes. U.S. Patent No. 3,925,200 generally discloses such a process. Although these well known flotation methods are quite effective for plastics having different specific gravities, they are ineffective for multilayer plastics, plastics having similar density ranges, or plastics that have been co-extruded.

Zielinski discloses a method for the separation and recovery of thermoplastic materials containing contaminants in U.S. Pat. No. 5,061,735. In this process, the thermoplastic material which is to be recovered is simultaneously heated and agitated along with a contaminant which could possibly be another thermoplastic material. The mixture is heated to a temperature at which the desired thermoplastic will adhere to itself, but the contaminant will not become tacky. The impacting thermoplastic particles agglomerate, while the contaminant particles do not adhere to other contaminant particles or to the agglomerating thermoplastic particles. The resulting mixture is then passed through a series of screens to separate the larger agglomerated thermoplastic particles from the smaller non-agglomerated contaminant particles.

Tomaszek, in U.S. Pat. No. 4,728,045 discloses a method for reclaiming resin materials from scrap articles formed of two bonded plastic components. The bonded material comprises a first low density resin component such as polyethylene and a second high density component, for example, polyethylene terephthalate. In separating such a bonded plastic, Tomaszek first granulates the scrap articles. Using air separation, Tomaszek removes any paper and film forming the labels from the ground particles. The lighter particles, polyethylene particles, are then separated from the heavier scrap particles using a flotation method. The heavier scrap particles are then vigorously washed in a hot aqueous medium to disrupt the bonds between the two resins in the particles. These particles are then washed and flotation separated. The heavy particles are removed, dried and re-used. The low density scrap particles from the second flotation stage are returned to the first flotation stage and the procedure is repeated. The Tomaszek method is quite ineffective in the separation of multilayer plastics, in particular those that have been co-extruded. Tomaszek also requires reiteration of laborious steps to obtain any separation of the constituent particles from the bonded material.

U.S. Pat. No. 4,199,109 to Wanatabe discloses a continuous flow operation for recovering the constituents of laminated articles. This method comprises the steps of heating multilayer plastic particles in the range of 80° to 200° Centigrade. After the separate heating step, the heated articles are then crushed by means of shearing, impact or tearing forces to peel the layers of the plastic articles into small pieces of the constituent resins. The small pieces are then separated into separate components, using either a flotation method, air current separation method or a separation method based upon differences of the dielectric constant or resistance of the constituents. The Wanatabe method also utilizes many steps to separate multilayer plastics.

Although these methods are useful, there exists a need for easy, efficient and inexpensive separation of articles or materials made from multilayer plastics into the different plastics which are part of the multilayer.

Accordingly, a primary objective of the invention is to both effectively and efficiently separate and segregate at least two of the components of the multilayer plastic.

Another object of the invention is to easily and economically separate and reclaim at least two of the constituents of the multilayer plastic.

Yet another object of the invention is to reclaim the constituents of co-extruded multilayer plastics so that they can be efficiently reprocessed or reused.

SUMMARY OF THE INVENTION

The foregoing and other objects, advantages and features of the invention may be achieved by a method of separating multilayer plastics into at least two of the components that comprise the multilayer plastic. More particularly, if materials or articles made of multilayer plastics are divided into smaller particles, and the particles are agitated and agglomerated, then the particles can be separated easily and efficiently into at least two of the components of the multilayer plastic due to the incompatibility of the different plastics and the different fuse temperatures of each of the component plastics of the multilayer plastic. The fuse temperature is the temperature at which the material softens, becomes sticky and tends to stick to itself. Like particles stick together and agglomerate. The desired reclaimed plastic particles can be separated from other contaminants or thermoplastics, easily reprocessed and recycled.

DETAILED DESCRIPTION OF THE INVENTION

Multilayer plastic materials are not easily and effectively separated by known separation techniques. Multilayer plastics can be formed by bonding, laminating or co-extruding numerous plastic materials. The multilayer materials are difficult to separate due to the physical forces acting on the constituent particles. The physical forces are especially great when multilayer plastics are co-extruded in a fashion that allows one layer to encapsulate the other plastic layer. Therefore, it is important to separate efficiently and effectively multilayer plastics into their components so that the desired components can be reclaimed and reprocessed instead of being discarded as waste. Several methods have been developed for separating multilayer plastics. These methods all require numerous time consuming, repetitive and laborious steps so that some degree of separation is achieved.

This invention relates to a method of separating multilayer plastics into at least two components of the multilayer plastic so that the components can be reused and reprocessed. Any flexible multilayer plastic with a fuse temperature in the desired operating temperature range of the process can be used to carry out the invention. The preferred multilayer plastic is a waste multilayer plastic material. The most preferred material is a co-extruded material of polyvinyl chloride and polyethylene.

In addition, the multilayer plastic material may contain fillers, smoke suppressants, flame retardants, pigments, thermal stabilizers, and other conventional additives. These conventional additives do not affect the novel process of the invention.

According to the invention, the multilayer plastic material is divided into small particles using any method to divide waste materials into small particles. For example, the material can be ground, shredded, chopped, flaked, sheared, crushed, comminuted, torn or otherwise reduced in size to smaller particles. The preferred method of dividing the waste multilayer plastic material is chopping or grinding. The size of the divided particles is not important, nor does it affect the process of the invention. Generally, particles ranging from approximately 0.2 millimeters to 1.0 centimeter have been used in the process of this invention.

The divided particles are then agitated and agglomerated in a high speed mixer. Any device imparting shearing force and heat to the divided particles can be used to agglomerate the at least two different types of particles. During the agglomeration process, the particles are heated close to the fuse temperature of the materials which are to be separated and recovered through friction and shearing of the particles when they are agitated in the mixer. Generally the fuse temperature of the two types of materials which are to be separately recovered ranges from 135 to 180 degrees Centigrade if one of the materials is PVC. However, different polymeric materials have different fuse temperature ranges. Therefore, the process should be carried out at temperatures which do not exceed the fuse temperatures of the desired thermoplastics which are to be seperated. If the divided waste plastic particles contain other wastes and thermoplastics which have fuse temperatures higher than the temperature achieved in the mixer, these particles do not agglomerate.

While in the mixer, the divided particles are simultaneously agitated while being heated. Because of the incompatibility of the different plastics at higher temperatures, like plastic particles impact against each other during this process and the same type of plastic particles will adhere to each other and agglomerate together. By this process, the desired like thermoplastic particles which are to be seperated, agglomerate together. In the preferred embodiment of the invention, the polyvinyl chloride particles agglomerate with other polyvinyl chloride particles, whereas polyethylene particles agglomerate with other polyethylene particles.

Water is sprayed or injected into the mixture to cool and quench the agglomerated particles in order to control the size of the agglomerates and to maintain distinct agglomerates of each of the materials which are to be separated. The temperature at which the water is injected is slightly above the fuse temperatures of the materials which are to be separated and recovered. This temperature can be determined by any conventional method. Preferably, the temperature is determined by monitoring the current through the drive motor of the mixer. When in the mixer, as the fuse temperature of the desired particles which are to be seperated is approached, there is a great increase in not only the frictional forces of the mixer but also the current. At the onset of this increase, there is a great increase in the frictional forces of the mixer which requires higher mechanical input to shear the material and cooling should be initiated at this point. The mixture can be cooled by any conventional method of cooling. For example, water can either be injected or sprayed into the mixer or mixing device.

If desired, a separation step may be conducted at this point to remove any non-agglomerated contaminants, including any non-recovered thermoplastics having higher fuse temperatures than the two different and separated agglomerated plastics. Any known separation technique can be used. Preferably, the contaminants are removed from the agglomerates using a screen.

Afterwards, one type of agglomerated plastic is separated from the other type of agglomerated plastic by any separation method such as centrifugation, or flotation for example. Although repetition of this separation step may possibly increase the yield a minuscule amount, the process becomes cost prohibitive with virtually no greater affect if repeatedly performed. Preferably, the heavier particles such as polyvinyl chloride particles are separated from the lighter particles, polyethylene by a flotation method through a controlled density medium.

In the preferred flotation method, the two different types of agglomerated particles are transferred into a tank with a density in between that of the two components. The preferred density is approximately 1.0 to 1.1 grams per cubic centimeter. The particles are maintained in the tank for an effective amount of time so that they are separated. The amount of time is dependent upon the type of flotation method used. In the preferred flotation method, the two different agglomerated particles are separated almost instantaneously. The particles having a lower density than the liquid in the tank float to the top of the tank while the heavier particles sink to the bottom of the tank.

After the separated plastic particles are recovered, they can be reused and reprocessed. Any method known for processing plastics, including molding, extruding or compounding can be used to reprocess the recovered plastic. When polyvinyl chloride is one of the plastic components recovered, preferably it is compounded and melt filtered in one step. These reprocessed plastics have acceptable mechanical and physical properties. Therefore, the reprocessed plastics can be used in commercial applications.

From the foregoing description, one skilled in the art can easily ascertain the essential characteristics of the invention and without departing from the spirit and scope thereof make various changes and modifications of the invention and adapt it to the various usages and conditions. Accordingly, the whole of the foregoing description is to be construed in an illustrative and not in a limitive sense, for the scope of the invention is defined solely by the appended claims.

EXAMPLES

Example 1

Example 1 is a comparision of applicant's invention with the conventional flotation process. A wire and cable fluff sample containing co-extruded polyethylene (PE) and PVC was randomly sampled out and analyzed using tetrahydrofuran (THF) dissolution. A weighed sample was added to a THF solvent in a jar. The solution was then stirred vigorously by a magnetic stirring bar until all the PVC dissolved in the THF. Contaminants such as metal, paper, and other polymers such as PE and polyethylene terephthalate will not dissolve in the THF. A screen (100-200 mesh) was used to separate the non-dissolved and dissolved solids. The undissolved solids were dried and weighed. The percentage of PVC and non-PVC was then calculated based on this initial sample weight. The sample was determined to be 19%+/−1% PE with the remainder PVC (81%+/−1%). The co-extruded PE/PVC fluff when cleaned through a conventional flotation separation process using water as a density medium with some soap as a dispersion agent. The following results were obtained:

| Lights | Float on water | 53% |
|---|---|---|
| Heavies | Sink in water | 47% |

In the flotation process, because the density of PVC (normally higher than 1.3 g/cm$^3$) is greater than the density of water (1 g/cm$^3$), PVC will sink to the bottom of the tank immediately. Based on this, the above results indicate that 53% of the total wire and cable feed will be considered contaminated using the conventional flotation separation process because the light stream will not be pure. Rather, the light stream will comprise PE contaminated by PVC. The light stream will, therefore, have inferior physical properties as compared to the physical properties of either pure PE or pure PVC.

Since we know there is only 19% of PE in the fluff, this means that 34% of PVC will be lost along with the PE if the conventional flotation process is used. This suggests that such technique is not efficient and has very low recovery. Using our process, we were able to recover both the individual plastics at a high recovery rate. The recovery rate using this invention ranged from approximately 85% to approximately 95%.

EXAMPLE 2

A comparision of our invention with the process disclosed in U.S. Pat. No. 5,061,735 was done in Example 2. The recycled wire and cable vinyl fluff which was used in Example 1 was also used in Example 2. The recycled wire and cable contains about 81% PVC. The non-PVC portion consists of PE, copper, aluminum and fluoropolymers. The fluff used in this experiment ranged from about 0.2 mm to 0.75 mm in size. The fluff, contaminated by aluminum, copper, fluoropolymers and co-extruded polyethylene was cleaned using Applicants' process and the exact equivalent of the process disclosed in U.S. Pat. No. 5,061,735 ("'735 Patent"). In Applicants' process, polyethylene agglomerates were effectively separated out, as were polyvinyl chloride agglomerates. Since PE agglomerates in the same manner as PVC, the PE agglomerates could not be separated out using the method of the '735 Patent's screening process because the two types of agglomerate are about the same size and screening cannot effectively separate the components. The products from both the processes were then reprocessed and the properties listed below were obtained. Process A corresponds to the process of the instant invention, whereas Process B corresponds to the process of the '735 Patent.

|  |  | A | B | % Difference |
|---|---|---|---|---|
| % PE analyzed (by weight) |  | 0.5 | 5 |  |
| Appearance |  | Glossy | Dull* |  |
| Tensile Strength, psi | ASTM-D412 | 2910 | 2585 | 11% |
| Tensile Elongation, psi | ASTM-D412 | 288 | 204 | 30% |
| Brittleness Temperature, °C. | ASTM-D746 | −16 | −13 | 19% |
| Graves Tear, lbf/in. | ASTM-D1004 | 551 | 526 | 5% |

The comparison shows that Applicant's recycled particles had substantially better physical properties than the particles recovered using the '735 Patent process.

We claim:

1. A method for separating and recovering at least two components of multilayer plastics comprising: dividing the multilayer plastic into small particles, agitating and agglomerating the particles in mixing means whereby like particles agglomerate and adhere to each other, quenching the particles to stop the agglomeration, and separating one type of agglomerated particle from the other type of agglomerated plastic particles.

2. A method as claimed in claim 1, wherein the multilayer plastic is divided into particles by grinding, shredding, chopping, flaking, shearing, crushing or tearing.

3. A method as claimed in claim 1, wherein one type of agglomerated plastic is separated from the other agglomerated plastic by flotation, or centrifugation.

4. A method as claimed in claim 1, wherein the particles are agitated and agglomerated by mixing means.

5. A method as claimed in claim 4, wherein the mixing means imparts shearing force and heats the particles to a temperature in the range of approximately 135 to 170 Degrees Centigrade.

6. A method as claimed in claim 5, wherein the particles are quenched by water which is either sprayed or injected into the mixing means.

7. A method for separating and recovering at least two components of co-extruded multilayer plastic comprising: dividing the multilayer plastic into small particles, agitating and agglomerating the particles whereby like particles agglomerate and adhere to each other, quenching the particles to stop the agglomeration, and separating one type of agglomerated particle from the other type of agglomerated plastic particles.

8. A method as claimed in claim 7, wherein the multilayer plastic is divided into particles by grinding, shredding, chopping, flaking, shearing, crushing or tearing.

9. A method as claimed in claim 7, wherein one type of agglomerated plastic is separated from the other agglomerated plastic by flotation, or centrifugation.

10. A method as claimed in claim 7, wherein the particles are agitated and agglomerated by mixing means.

11. A method as claimed in claim 10, wherein the mixing means imparts shearing force and heats the particles to a temperature in the range of approximately 135 to 170 Degrees Centigrade.

12. A method as claimed in claim 11, wherein the particles are quenched by water which is either sprayed or injected into the mixing means.

* * * * *